United States Patent [19]

Sandberg

[11] 4,173,127
[45] Nov. 6, 1979

[54] FROST REMOVAL APPARATUS FOR CRYOGENIC FREEZING TUNNEL

[75] Inventor: Glenn A. Sandberg, Lockport, Ill.
[73] Assignee: Formax, Inc., Mokena, Ill.
[21] Appl. No.: 847,720
[22] Filed: Nov. 2, 1977
[51] Int. Cl.² .......................... F25D 3/10; F25D 25/04
[52] U.S. Cl. ....................................... 62/374; 62/380
[58] Field of Search .................. 62/380, 303, 374, 63; 198/496; 134/1; 165/94

[56] References Cited

U.S. PATENT DOCUMENTS 1,817,890  8/1931  Birdseye ............................ 62/303 X
3,427,820  2/1969  Hart ................................... 62/380 X
3,915,737  10/1975  Sroka ..................................... 134/1

FOREIGN PATENT DOCUMENTS 765866  1/1957  United Kingdom ..................... 198/496

Primary Examiner—Ernest R. Purser
Attorney, Agent, or Firm—Kinzer, Plyer, Dorn & McEachran

[57] ABSTRACT

Cryogenic freezing tunnel for comestibles supported on an open mesh conveyor belt in which frost is scrubbed from opposed surfaces of the conveyor by brushes of unique construction.

4 Claims, 5 Drawing Figures

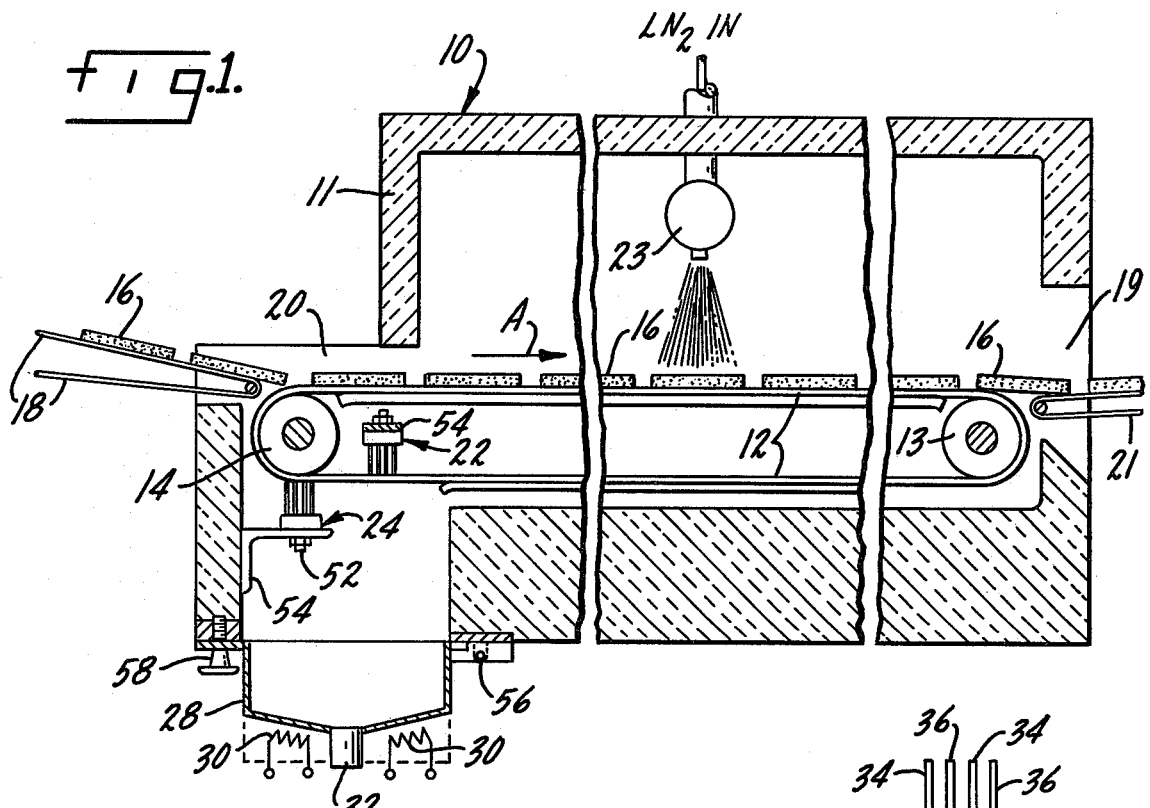
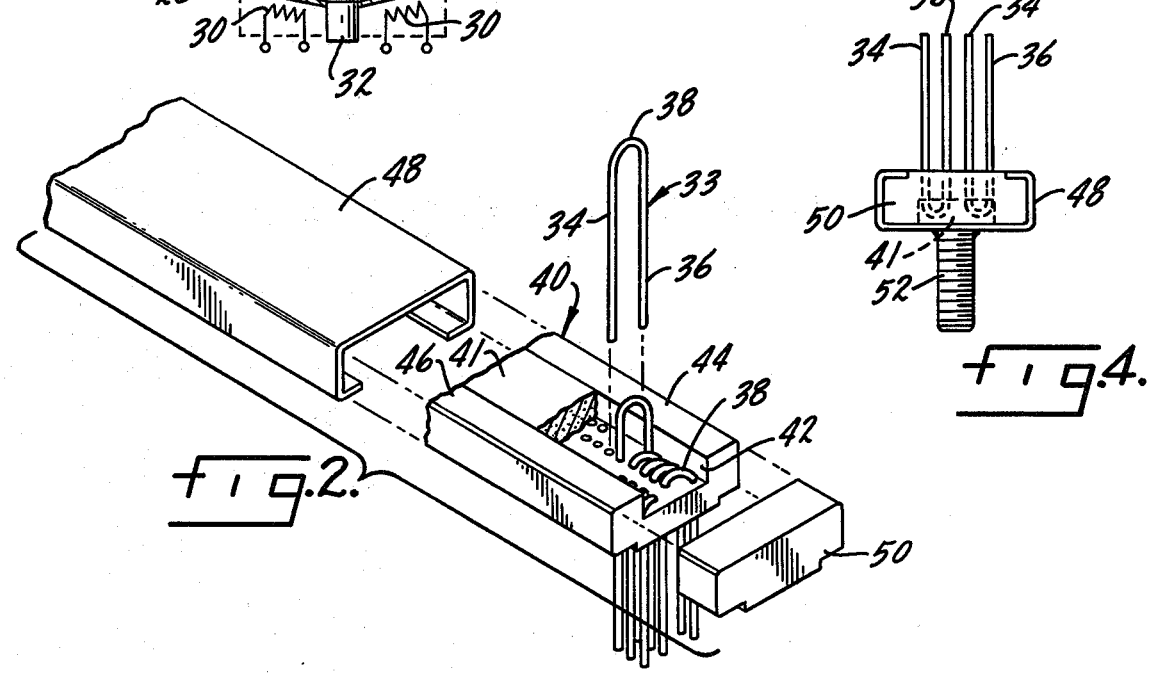
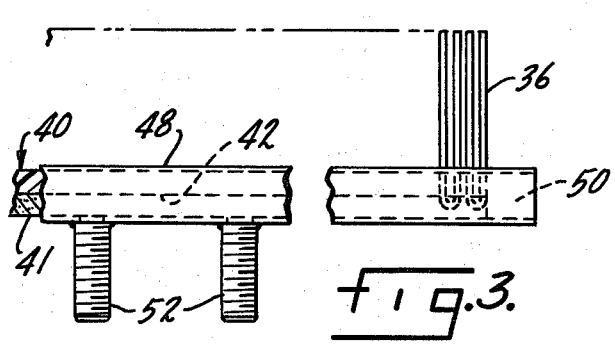
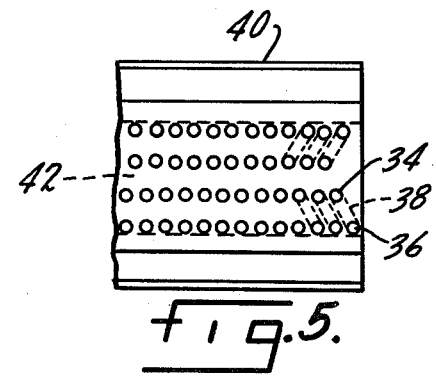

FROST REMOVAL APPARATUS FOR CRYOGENIC FREEZING TUNNEL

This invention relates to frost-removal apparatus for a freezing tunnel for freezing comestibles such as hamburger patties.

Freezing is effected in the tunnel by spraying with a cryogenic fluid such as liquid nitrogen. To assure effective treatment the comestibles are supported in the tunnel on an open mesh conveyor of stainless steel so that the swirling fluid may contact all sides of the food product.

It is not possible to prevent ingress of moisture into the tunnel. Invariably the food product contains moisture; also, ambient moisture enters the tunnel through the same opening by which the food product is introduced. Consequently frost is entrained in the interstices of the stainless steel mesh and this interferes with the cryogenic action.

In accordance with the primary object of the present invention the conveyor is continuously scoured to remove accumulated frost and this is preferably accomplished by a pair of brushes supported in contact with both surfaces of the conveyor at the end thereof where the lower pass of the conveyor reverses to the upper pass.

Equipment of the present kind must comply with health standards. Ordinary brushes are not likely to be deemed acceptable in an environment where a food product is being processed for packaging. The reason is the bristles of an ordinary brush, even stiff ones, are so closely clustered that particles become trapped in the bristles, a condition likely to be objected to by health inspectors. Accordingly another object of the invention is to construct a brush which will overcome such an objection and another, related, object is to collect, condense and drain the frost from the interior of the tunnel.

IN THE DRAWING

FIG. 1 is a schematic drawing illustrating the principles of the present invention;

FIG. 2 is an exploded assembly view of the brush;

FIG. 3 is a fragmentary side elevation of the brush;

FIG. 4 is an end view of the brush;

FIG. 5 is a fragmentary plan view of the brush.

The principle of the present invention is shown schematically in FIG. 1 where a cryogenic freezing tunnel 10 is employed in freezing food products introduced thereto from an external source.

The freezing tunnel comprises an insulated housing 11 in which is arranged an open mesh transporting conveyor of endless belt form 12. Since a food product is being handled, the conveyor belt 12 is of stainless steel in accordance with health standards. The conveyor is trained around two sprockets 13 and 14 and is driven by a suitable motor (not shown) in the direction of the arrow A.

The food product (comestibles) may be represented by hamburger patties 16 transported on an endless in-feeding conveyor 18 which feeds the comestible through an entrance opening 20 located in the end wall of the freezing tunnel 10 adjacent the reversing sprocket 14 so that the patties 16 are deposited on the upper pass of the conveyor 12. The food products 16 leave the tunnel through an exit opening 19, being deposited on a takeaway conveyor 21. All of the conveyors may be relatively wide, so that the in-feeding conveyor 18, the transporting conveyor 12, and the takeaway conveyor 21 all may be effectively loaded with numerous patties in transverse rows.

The cryogenic medium may be liquid nitrogen under forced convection inside the tunnel, introduced into the tunnel through a supply conduit and spray header 23 and distributed through the tunnel by means of a series of fans (not shown). Thus, the food product on the conveyor belt 12 is continuously exposed to the freezing medium, accounting for the open mesh form for the conveyor 12, allowing the freezing mist and the subsequently formed cold gas to contact the food product from the underside of the conveyor belt as well as from the upper side.

It is of course not possible to prevent the ingress of moisture. There is moisture in the ambient atmosphere, having access through the opening 20 in the freezing tunnel, and of course the food product itself contains moisture. Resultantly, frost tends to accumulate in the interstices of the conveyor belt 12 and this accumulation will interfere with movement of the freezing mist and gas through the conveyor belt at the underside of the food product. To enhance the efficiency of treatment, the conveyor belt 12 is scoured on both surfaces to remove the frost. The most efficacious manner of accomplishing this is shown in FIG. 1 in terms of two brush assemblies 22 and 24 in position to scrub both sides of the conveyor belt adjacent the sprocket 14 where the lower pass is reversed into the upper pass. At this point, the conveyor belt 12 is being freed of frost so that the patties 16 are deposited on a conveyor 12 which has been thoroughly purged of frost.

The frost particles, flaked off by the brushes, fall into a collector pan 28 positioned in the freezing tunnel immediately beneath both brush assemblies 22 and 24. A mild degree of heat, sufficient to melt the frost, may be imparted to the pan 28 as by electrical resistance elements 30 and the pan itself may be connected to a drain pipe 32 for removing the water. Also, the drain pan 28 may be supported inside the tunnel for easy removal, for cleaning.

An ordinary brush is quite unsatisfactory, even though stiff enough to thoroughly purge the belt 12 of frost, because the ordinary brush bristles are so closely packed that the brush cannot be examined for cleanliness. In accordance with the present invention, the brush bristles are not closely nested but to the contrary are widely separated in both rows and columns so that the spaces between the bristles may be clearly examined for any unacceptable entrainment. In achieving this, the brush bristles, FIG. 2, consist of individual bristle elements 33 of nylon plastic bent hairpin fashion so that two bristles 34 and 36 project in parallel fashion from the bend 38.

The bristles are supported in a supporting base 40, which is preferably formed of an innocuous plastic or resin) such as ABS resin. The brush base 40 is provided with a series of pairs of openings into which the bristle legs 34 and 36 are extended with the bend implanted therebetween. The openings are in parallel columns extending endwise of the base 40 but are off-set as shown in FIG. 5 to assure more effective action on the conveyor 12.

The openings for the bristles are presented in a recess 42 in the base 40. After the bristles have been implanted the channel is filled with a suitable, innocuous cement of resin or plastic form (again, ABS resin is suitable), filling the recess 42 flush to the shoulders 44 and 46. This firmly anchors the bristle elements 33 in the brush base 40. The support base 40 is then encapsulated by sliding a stainless steel channel-shaped cover or holder 48 thereover; afterward, any empty spaces are filled with the same resin and a stainless steel end plug 50 is then clamped to each end of the casement or cover 48 until the resin has set, after which the end plugs 50 are welded to the ends of the cover 48.

As shown in FIGS. 3 and 4, the spaces between the bristles 34 and 36 are clearly discernible both from the side and the end whereby the condition of the brush may be determined on visual inspection. Nonetheless, the bristles are sufficiently sturdy and wear resistant as to be capable of thoroughly purging the conveyor belts from accumulated frost over prolonged periods of operation.

The brush cover may be provided with threaded shanks 52 for securement to mounting brackets 54, FIG. 1, in turn supported inside the tunnel in any desired fashion. The precise manner of securement is not important.

The pan 28 may be releaseably supported on a pivot 56, FIG. 1, and secured to the tunnel by a release screw 58; also, the heater elements may be part of the pan structure.

I claim:

1. Frost removal apparatus for a cryogenic freezing tunnel of the kind in which comestibles, delivered from an outside source, are frozen by contact with a fluid cryogen introduced into the tunnel, a conveyor of open-mesh endless belt form inside the tunnel presenting a reverse turn where the path of the conveyor belt reverses from a lower pass in one direction to an upper pass in the opposite direction, an input opening in one wall of the tunnel through which the comestibles are fed and deposited on the conveyor, the frost removal apparatus comprising a brush engaging the conveyor in its lower pass for brushing accumulated frost from the interstices of the conveyor, a pan to collect the frost brushed from the conveyor, and a heater means to melt the collected frost in the pan.

2. Frost removal apparatus for a freezing tunnel according to claim 1 comprising a pair of brushes engaging opposed sides of the conveyor in the lower pass, both brushes being in alignment with the pan and heater means, and each brush comprising a brush base having a plurality of openings in which are inserted individual bristles widely separated from one another both in rows and columns so that spaces between the bristle rows may be visually inspected both endwise and sidewise for cleanliness.

3. Frost removal apparatus for a freezing tunnel according to claim 2 in which the bristles are of plastic bent hairpin fashion.

4. Frost removal apparatus for a freezing tunnel according to claim 5, in which the brush comprises an elongated base having a longitudinal recess and a multiplicity of bristle openings extending through the base into the bottom of the recess, the openings being arranged in a plurality of widely spaced rows and columns to facilitate visual inspection of the brush, a multiplicity of individual U-shaped resin bristle elements each inserted through two adjacent openings in the base to form two bristles for the brush, the bight portion of each bristle element being seated in the bottom of the recess in the base, a resin filling for the recess, anchoring the bristle elements in the brush base, and a channel-shaped metal cover covering the back of the brush base.

* * * * *